(12) United States Patent
Krywaniuk

(10) Patent No.: US 9,825,915 B2
(45) Date of Patent: *Nov. 21, 2017

(54) COMPUTERIZED SYSTEM AND METHOD FOR DEPLOYMENT OF MANAGEMENT TUNNELS

(71) Applicant: Fortinet, Inc., Sunnyvale, CA (US)

(72) Inventor: Andrew Krywaniuk, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,205

(22) Filed: Mar. 24, 2017

(65) Prior Publication Data

US 2017/0201488 A1    Jul. 13, 2017

Related U.S. Application Data

(63) Continuation of application No. 14/816,030, filed on Aug. 2, 2015, now Pat. No. 9,673,987, which is a
(Continued)

(51) Int. Cl.
*H04L 29/06* (2006.01)
(52) U.S. Cl.
CPC ........ *H04L 63/029* (2013.01); *H04L 63/0435* (2013.01); *H04L 63/0442* (2013.01); *H04L 63/061* (2013.01); *H04L 63/0823* (2013.01)
(58) Field of Classification Search
CPC . H04L 63/029; H04L 63/061; H04L 63/0435; H04L 63/0823; H04L 63/0442
See application file for complete search history.

(56) References Cited

U.S. PATENT DOCUMENTS

| 4,688,250 A | 8/1987 | Corrington et al. |
| 5,708,780 A | 1/1998 | Levergood et al. |

(Continued)

OTHER PUBLICATIONS

Seppo Heikkinen and Bilhanan Silverajan. "An Architecture to Facilitate Membership and Service Management in Trusted Communities." 2009 International Conference on Computational Aspects of Social Networks. 6 pages.
(Continued)

*Primary Examiner* — Mahfuzur Rahman
*Assistant Examiner* — Narciso Victoria
(74) *Attorney, Agent, or Firm* — Hamilton, DeSanctis & Cha LLP

(57) ABSTRACT

Methods and systems for deploying management tunnels between managed and managing devices are provided. According to one embodiment, the use of PKI-authenticated serial numbers within network devices manufactured by a particular manufacturer enables one-step provisioning of one or more managed devices. A managed device is provisioned with the serial number of a management device manufactured by the particular manufacturer. When the managed device is installed within a network, the management device is located by the managed device with the assistance of a locator server and the managed device initiates establishment of an encrypted management tunnel with the management device. Prior to allowing the management device to use the management tunnel to perform management functionality in relation to the managed device, credentials of the management device are verified by the managed device by comparing the PKI-authenticated unique identifier of the management device to that which is stored within the managed device.

14 Claims, 4 Drawing Sheets

Related U.S. Application Data continuation of application No. 14/499,128, filed on Sep. 27, 2014, now Pat. No. 9,240,890, which is a continuation of application No. 13/965,316, filed on Aug. 13, 2013, now Pat. No. 9,294,286, which is a continuation of application No. 11/375,251, filed on Mar. 15, 2006, now Pat. No. 8,510,812.

(56) References Cited

U.S. PATENT DOCUMENTS

| | | | |
|---|---|---|---|
| 5,790,548 | A | 8/1998 | Sistanizadeh et al. |
| 6,058,420 | A | 5/2000 | Davies |
| 6,061,796 | A | 5/2000 | Chen et al. |
| 6,151,679 | A | 11/2000 | Friedman et al. |
| 6,304,973 | B1 | 10/2001 | Williams |
| 6,393,565 | B1 | 5/2002 | Lockhart et al. |
| 6,640,302 | B1 | 10/2003 | Subramaniam et al. |
| 6,865,673 | B1 * | 3/2005 | Nessett .................. H04L 41/28 380/247 |
| 7,600,113 | B2 * | 10/2009 | Kuehnel ............... G06F 21/445 709/224 |
| 7,607,140 | B2 | 10/2009 | Kato et al. |
| 7,768,954 | B2 | 8/2010 | Guthrie |
| 7,904,952 | B2 | 3/2011 | Yeap et al. |
| 8,327,436 | B2 | 12/2012 | Randle et al. |
| 8,510,812 | B2 | 8/2013 | Krywaniuk |
| 9,240,890 | B2 | 1/2016 | Krywaniuk |
| 9,294,286 | B2 | 3/2016 | Krywaniuk |
| 9,673,987 | B2 | 6/2017 | Krywaniuk |
| 2005/0164678 | A1 | 7/2005 | Rezvani et al. |
| 2007/0217344 | A1 | 9/2007 | Krywaniuk |
| 2009/0006850 | A1 * | 1/2009 | Birger ............... H04L 29/12207 713/169 |
| 2013/0332997 | A1 | 12/2013 | Krywaniuk |
| 2015/0052362 | A1 | 2/2015 | Krywaniuk |
| 2015/0341313 | A1 | 11/2015 | Krywaniuk |

OTHER PUBLICATIONS

Final Rejection for U.S. Appl. No. 13/965,316 dated Jan. 27, 2015.
Non-Final Rejection for U.S. Appl. No. 13/965,316 dated Jul. 30, 2014.
Notice of Allowance for U.S. Appl. No. 11/375,251 dated Jul. 9, 2013.
Non-Final Rejection for U.S. Appl. No. 11/375,251 dated Sep. 30, 2010.
Non-Final Rejection for U.S. Appl. No. 11/375,251 dated Jul. 6, 2009.
Final Rejection for U.S. Appl. No. 11/375,251 dated Mar. 25, 2010.
Notice of Allowance for U.S. Appl. No. 14/499,128 dated Nov. 18, 2015.
Notice of Allowance for U.S. Appl. No. 13/965,316 dated Feb. 12, 2016.
Non-Final Rejection for U.S. Appl. No. 14/499,128 dated Jul. 31, 2015.
2nd Notice of Allowance for U.S. Appl. No. 14/816,030 dated Mar. 6, 2017.
1st Notice of Allowance for U.S. Appl. No. 14/816,030 dated Jan. 31, 2017.

* cited by examiner

COMPUTERIZED SYSTEM AND METHOD FOR DEPLOYMENT OF MANAGEMENT TUNNELS

CROSS-REFERENCE TO RELATED APPLICATIONS

This application is a continuation of U.S. patent application Ser. No. 14/816,030, filed Aug. 2, 2015, now U.S. Pat. No. 9,673,987, which is a continuation of U.S. patent application Ser. No. 14/499,128, filed Sep. 27, 2014, now U.S. Pat. No. 9,240,890, which is a continuation of U.S. patent application Ser. No. 13/965,316, filed Aug. 13, 2013 now U.S. Pat. No. 9,294,286, which is a continuation of U.S. patent application Ser. No. 11/375,251 filed Mar. 15, 2006, now U.S. Pat. No. 8,510,812, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2006-2017, Fortinet, Inc.

BACKGROUND

Field

Embodiments of the present invention generally relate to computer networks. In particular, embodiments of the present invention relate to establishing management tunnels between network devices.

Description of the Related Art

When a network-enabled device (management device) remotely manages another networking device (managed device), a communication channel (also referred to herein as "tunnel") is established between the two in order to prevent possible malicious interference. The communication channel provides a means by which data can be transferred from one device to another without risk of interception or tampering. To this end, in many cases, it is desirable for the communication channel to be encrypted in order to prevent malicious interference. The goal of the provisioning process is to set up a communication channel between a managed device and its associated management device.

In order to establish a communication channel, the two devices must each be aware of the other's credentials. In other words, an authentication and authorization mechanisms must be employed in order to ensure the integrity of the tunnel. This is typically accomplished by using one of many well-known public key exchange protocols employed in conjunction with certificates assigned to respective devices by a trusted certificate authority (CA). Examples of such protocols include, without limitation, Secure Sockets Layer (SSL), Internet Protocol Security (IPsec) and the like. Other available authorization options may include, for example, the use of access control lists (ACLs), which may be based on an IP address or other unique identifier (ID). The content of the communications between the devices may be encrypted and/or authenticated using the public key of the respective device using one of the existing cipher algorithms in order to ensure that the transferred content remains private.

Unfortunately, existing network management systems require extensive manual configuration associated with assigning various certificates and keys to the participating network devices in order to enable the communication channel functionality and with the use of IP addresses and usernames of the participants. Therefore, what is needed is a system with an ability to facilitate efficient deployment of management channels between networking devices.

SUMMARY

Methods and systems are described for deploying management tunnels between managed and managing devices. According to one embodiment, a system comprising multiple network devices is provided, including a management device, a managed firewall device and a locator server with which the management device registers and updates its current IP address. The management device is manufactured by a particular manufacturer and is programmed to remotely monitor or manage, via a network-enabled management interface, one or more network devices within a private Internet Protocol (IP) network that are manufactured by the particular manufacturer. During a manufacturing or distribution process of each of the network devices, a digital certificate/private key pair and a unique identifier of the network device are stored therein. The unique identifier is authenticated by the digital certificate which is signed by the particular manufacturer, thereby providing a Public Key Infrastructure (PKI)-authenticated unique identifier within each of the network devices. Prior to installation within the private IP network, the managed firewall device is configured to trust the management device by storing the unique identifier of the management device within the managed firewall device. Responsive to being installed within the private IP network, the managed firewall device initiates establishment of an encrypted management tunnel with the management device by retrieving the current IP address of the management device from the location server and sending a message to the management device. Prior to allowing the management device to use the encrypted management tunnel to perform management functionality in relation to the managed firewall device, credentials of the management device are verified by the managed firewall device by comparing the PKI-authenticated unique identifier of the management device to the unique identifier of the management device to the unique identifier of the management device stored within the managed firewall device.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Methods and systems are described for deploying management tunnels between managed and managing devices. In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or a combination of software and hardware.

The inventor recognized that it would have been advantageous to provide a mechanism whereby communication tunnels between devices are deployed in a simple and efficient manner. The provisioning process involves exchange of information resulting in setting up both the trust relationship and the network address relationship between two devices. After the appropriate relationships are established, the two devices can communicate with one another.

In accordance with various aspects of the inventive concept, the communication channel setup process is facilitated via a number of different mechanisms. Firstly, in accordance with an embodiment of the inventive methodology, the participating managed devices and management devices are pre-configured (at the factory or by the distributor) to participate in a web of trust. In many cases, this would be controlled by a centralized certificate authority (CA) that is controlled by the manufacturer, but it could also be accomplished using other hierarchical or non-hierarchical systems often using public key cryptography.

In one typical case, the devices are pre-configured with a unique certificate/private key pair during the manufacturing process. This certificate is signed by the manufacturer using a private CA (or even a public one). Additionally, each device is also preconfigured with a unique identifier. This may be the product's serial number, or it could even be the public key fingerprint (or digest) from the certificate. In order to be useful as an authentication credential, the unique identifier must be authenticated by the certificate. In the case where the key fingerprint is used as the id, this is implicit. In the case where the unique identifier is a serial number, the serial number should be included in the certificate data.

Figure 1:
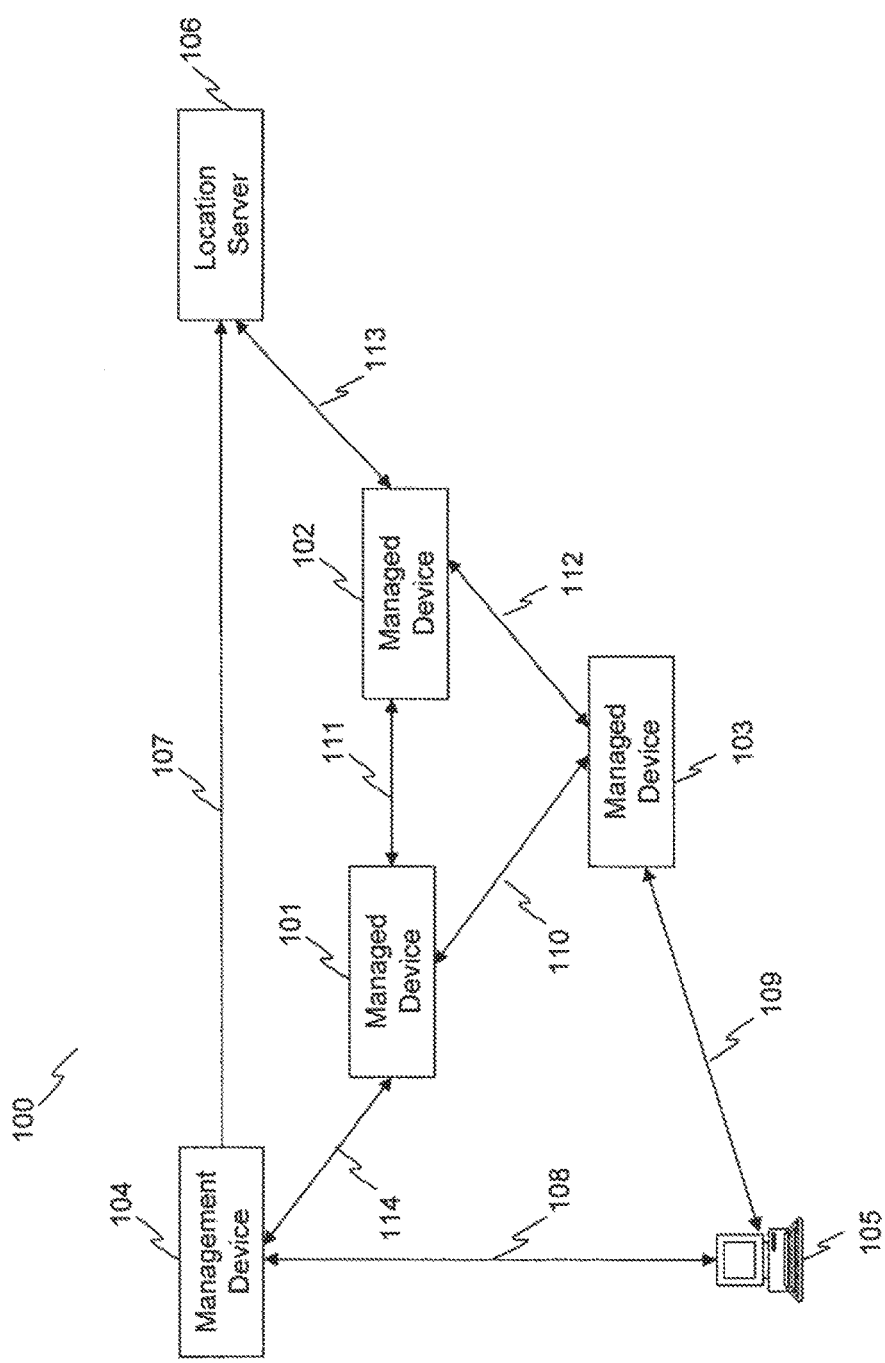
FIG. 1 depicts a conceptual block-diagram of a topology of network system in accordance with an exemplary embodiment inventive network system.

FIG. 1 depicts a conceptual block-diagram of a network topology in accordance with an exemplary embodiment the inventive concept. Specifically, the shown network topology includes four primary entities: managed devices 101, 102 and 103, a management device 104, an administrator's PC 105 and a management device locator server 106. In one embodiment of the inventive system, managed devices 101-103 are firewall systems, such as a FORTIGATE firewall. In an embodiment, management device 104 may be any networking device having a network-enabled management interface. The management interface may be implemented using a variety of known techniques, including, without limitation, Hypertext Markup Language (HTML) web-based graphical user interface (GUI), Java, Secure Shell (SSH), telnet, and other suitable programming languages and as well as various application-specific management protocols.

In an embodiment of the inventive concept, management device 104 is an embedded device, which is a special-purpose computer system performing pre-defined set of tasks, such as logging or network management functions. Examples of such embedded devices include FortiAnalyzer or FortiManager, which may be both used at the same time.

In another embodiment of the invention, management device 104 may be implemented as a server that is accessible from across the Internet. Management device 104 provides the management functionality for one or more of managed devices 101-103. The exact nature of the management operation of management device 104 is not essential to the concept of the present invention. Therefore, the inventive concept is not limited to any specific management function.

Exemplary management functions which may be performed across the communication channel may include remotely configuring one or more of managed devices 101-103, as well as collecting and/or analyzing various data from one or more of managed devices 101-103. As will be appreciated by those of skill in the art, any other management functions may be supported, as long as the associated management-related commands and data are transmitted across the provisioned communication channel.

In an embodiment of the inventive system, a network administrator may have his/her own personal computer system (e.g., PC 105) from which he or she may access both managed devices 101-103 and management device 104 from across the network.

In the network topology shown in FIG. 1, managed devices 101-103 and management device 104 would typically have fixed IP addresses and/or Uniform Resource Locators (URLs). On the other hand, the administrator could connect from an arbitrary location. In another embodiment of the invention, managed devices 101-103 and management device 104 each have dynamic IP addresses, which may change from time-to-time.

An embodiment of the inventive system also includes a management device locator server 106 operable to provide a functionality whereby any of managed devices 101-103 can locate the corresponding management server 104. In one embodiment, management locator server 106 is a public server with which management device 104 can register its current IP address, see FIG. 1, at 107. To this end, management device locator 106 can execute, for example, a modified dynamic Domain Name System (DNS) protocol. As would be appreciated by those skill in the art, other implementations of management device locator 106 are possible and, therefore, the present invention is not limited to any specific implementation. Once management device 104 properly registers, management device locator 106 can supply its network address to managed devices 101-103 upon receipt of appropriate request(s) 113. If during the operation, the network address of management device 104 changes, management device 104 may be required to update its address information with management device locator 106.

In an alternative embodiment, management device locator 106 is implemented as one of the already deployed managed devices 101-103 that is specifically pre-configured to share information about its associated management device with its peers.

The communication channel setup procedure will now be described. In order to facilitate the channel setup process, in one embodiment of the inventive system, the various networking entities shown in FIG. 1 may be pre-configured with appropriate certificates and unique identifiers.

In one embodiment of the inventive methodology, the provisioning of a communication channel 114 may be initiated from managed device 101-103. In this embodiment, the administrator may trigger the setup of communication management channel 114 via a user interface of one of the managed devices, for example device 101. As would be appreciated by those of skill in the art, to enable networking communications, the various networking devices which comprise the inventive system may be connected (directly or indirectly) via an IP network.

Figure 2:
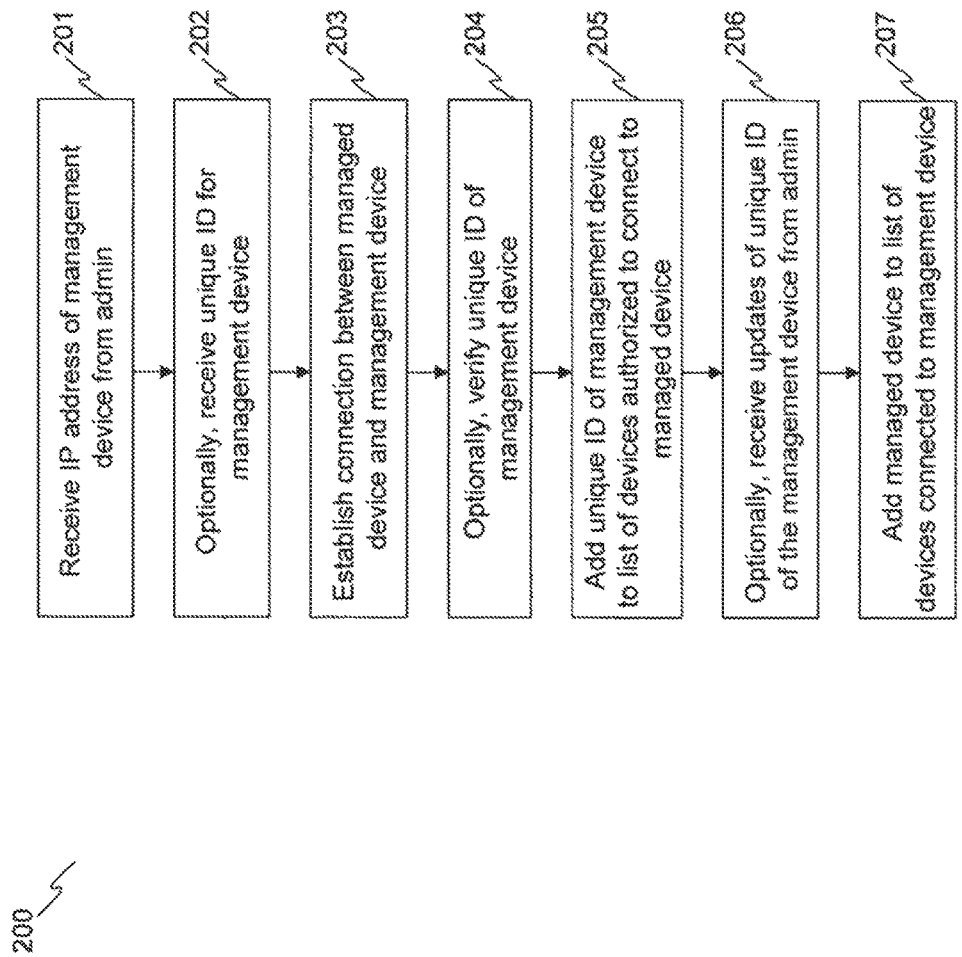
FIG. 2 illustrates a block-diagram of a communication channel setup procedure in accordance with an exemplary embodiment of the inventive methodology.

Various steps of the algorithm 200 for establishing communication management tunnel are illustrated in FIG. 2. With reference to FIG. 2, the administrator first specifies the IP address of the management device via a user interface of the managed device, step 201. Optionally, the administrator can also specify the unique identifier of the management device (step 202). The network address and, optionally, the unique identifier are used by the managed device to establish a connection to the management device and to subsequently verify its identity. At step 203, the managed device connects to the management device using one of the known networking mechanisms. The connection may be achieved either immediately or within a short period of time.

Once the connection has been established, the administrator may optionally verify the unique identifier of the management device (step 204). The verification step may be performed either manually or automatically. Subsequently, the managed device stores the unique identifier of the management device 104 as the one that is authorized to connect to it (step 205). This stored unique identifier is used for all future connection requests to authenticate a management device requesting a connection. In one embodiment, connection attempts from an unauthorized management device are logged and flagged for a subsequent audit.

The network system administrator has the ability to update the stored unique identifier of the authorized management device, or, alternatively, to reset it (step 206). If the unique identifier has been reset, the next management device attempting to connect to the managed device is deemed to have been auto-approved.

At step 207, management device 104 adds the managed device to the list of devices that have connected. In many cases, it could also begin to apply a default management policy to the managed device. At a later time, the administrator can easily add special policies for this managed device, and, possibly, assign it an alias (alternate name). Alternatively, the administrator could add policies and an alias for the device prior to its first connection, using either the unique identifier or the initial IP as the device identifier.

Another aspect of the inventive methodology is a cloned configuration, wherein several managed devices are purchased by the same end user for inclusion into the same network. The managed devices may be of the same type or of different types. In one embodiment of the invention, prior to installation, these devices are pre-configured to trust a specific management device. Such a configuration is advantageous because once the devices are incorporated into the network, no additional configuration steps are necessary to establish a management channel. The requisite pre-configuration may be accomplished, for example, by the manufacturer of the devices.

In an alternative embodiment, the network devices are pre-configured to form a web of trust wherein each device is able to accept recommendations for an identity of the management server from the other member devices. When communication channel 114 is established (for example, via a mechanism similar to the mechanism described hereinbefore), rather than providing the IP address and unique identifier of the management device, the IP address (and optionally unique identifier) of another managed device is configured instead. The managed device downloads the IP address and unique identifier of the management server from its appropriately configured peer and then establishes the communication channel with the management using the received credentials.

Yet another embodiment of the inventive system is designed to handle the situation wherein the management device was not specifically designed to work with the inventive managed devices. Specifically, such legacy management devices may not use the equivalent certificates, unique identifier credentials, and/or other security attributed required to establish the management tunnel with inventive devices. In this embodiment, the inventive managed device wishing to establish a communication channel with a legacy management device, may download a completely different type of credential for such legacy management device. For example, the managed device may acquire a username and password for the management device from its web of trust peer. Once the appropriate credential(s) is received, the inventive managed device proceeds to establish a connection with the target legacy device.

Figure 3:
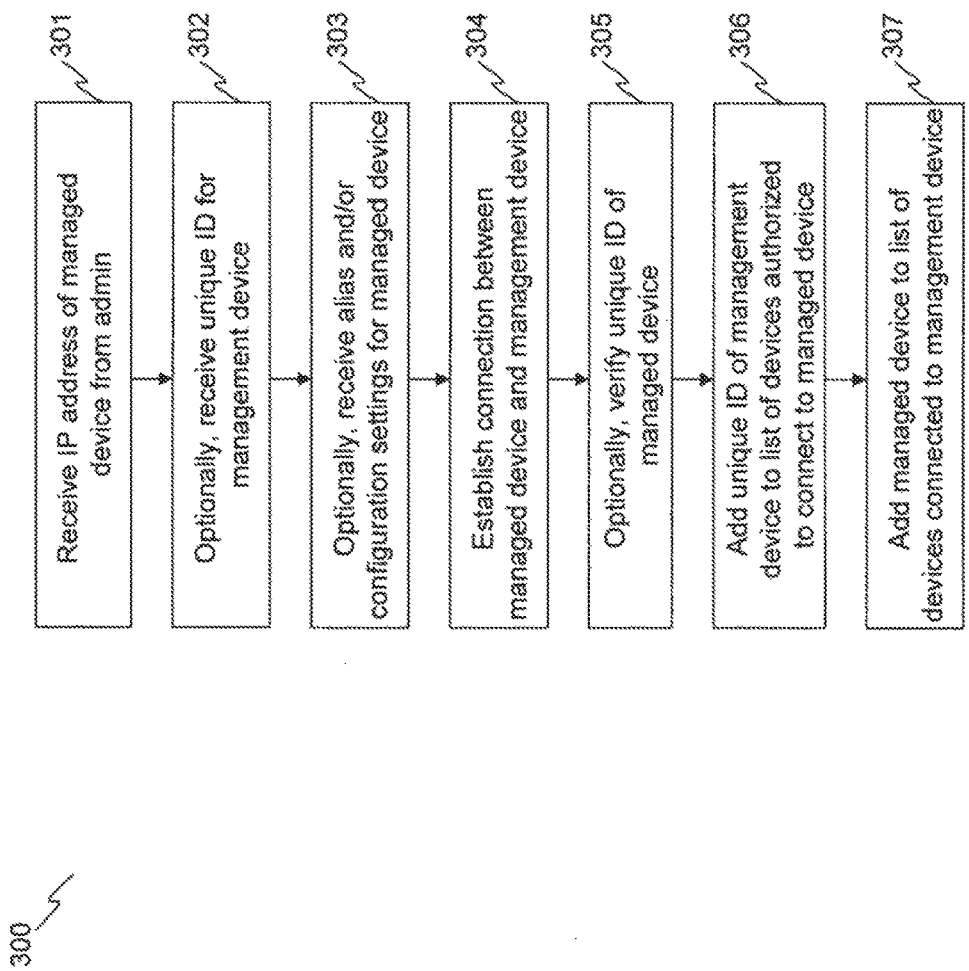
FIG. 3 illustrates a block-diagram of a communication channel setup procedure in accordance with another exemplary embodiment of the inventive methodology.

FIG. 3 illustrates an exemplary embodiment of an inventive method wherein the establishment of a communication channel 114 is triggered from management device 104. In this example, the administrator may trigger the setup of management channel 114 via a user interface of management device 104. As would be appreciated by those of skill in the art, when the function of the management device is to configure the managed device via the established communication channel, in order to first establish such a channel, the managed device needs to have been already pre-provisioned with a minimum configuration required to access the public network and allow the management device to connect to it. In many cases, such minimal configuration would include an assigned IP address, a default route, and a policy to allow remote management. Management device 104 connects to the managed device and authenticates using a dedicated user account, which can be authenticated using the pre-provisioned credential.

In an embodiment of the inventive concept, the managed device may be placed on the same physical network as management device 104 and employ a broadcast protocol that advertises implicit acceptance of a connection from any management device on the same local network.

In particular, in one embodiment, the management device solicits potential managed devices by sending a broadcast message (e.g. Ethernet broadcast or IP broadcast or subnet directed broadcast), or via direct polling of a range of addresses. In the case of local broadcasts, the managed device may employ a method to confirm that the management device is on the locally connected network (e.g., by verifying that the IP is in the same subnet or by using traceroute or DNS queries to verify that it is within the local entity's network).

In another embodiment, the managed device solicits potential management devices by sending a broadcast message. If a suitable management device receives the message, it should reply and setup a communication channel. In another embodiment, a second managed device will respond to the broadcast query from the first managed device and it will communicate the address and unique ID of a known management device to the first managed device.

In the case of multiple replies to the managed device's broadcast message, a conflict resolution algorithm may be used. The conflict resolution algorithm may be based on which reply message arrives first. Alternately, the algorithm may be based on the unique ID of the management device. For example, if the unique ID is a serial number, the algorithm may choose the highest serial number, which may represent the newest device. Alternately, the managed device may wish to communicate with multiple management devices of one or more types, in which case it is desirable to receive multiple replies to the broadcast.

As in other embodiments of the inventive concept, in order to establish the communication channel, the managed device may authenticate the management device based on its credential, and the management device may authenticate the managed device based on its credential.

In yet alternative embodiment, the managed device may be connected to management device 104 via a direct connection, including, without limitation, Universal Serial Bus (USB), Firewire, or Ethernet, in order to undergo initial provisioning.

An embodiment of inventive algorithm for establishing a communication channel from management device 104 is described below. This algorithm is generally similar to the algorithm depicted in FIG. 2, but with some roles reversed.

Specifically, with reference to FIG. 3, at step 301, the administrator first specifies the IP address of the managed device. Optionally, he or she can additionally specify the unique identifier of the managed device (step 302). Yet optionally, he can assign the managed device an alias (friendly name), or pre-configure certain settings relating to the management of the managed device (step 303). At step 304, management device 104 connects to the managed device via appropriate networking mechanism. The connection may be established either immediately or within a short period of time.

Optionally, at step 305, after the connection has been established, the administrator can verify, either manually or automatically, the unique identifier of the managed device. At step 306, the managed device stores the unique identifier and, optionally, the IP address of management device 104 as the one that is authorized to connect to it. This stored unique identifier is used for all future connection requests to authenticate a management device requesting a connection. In one embodiment, connection attempts from an unauthorized management device are logged and flagged for a subsequent audit. Finally, at step 307, management device 104 adds the managed device to the list of devices that have been connected.

The described provisioning process establishes both the trust relationship and the network address relationship between the managed device and the management device, both of which are necessary ingredients for setting up the communication management channel. Once there is a trust relationship and the devices know how to locate each other, the resulting communication channel may be implemented using, for example, IPsec, SSL, SSH, Simple Network Management Protocol (SNMP) or any other networking and security protocols. In one embodiment of the invention, communication channel 114 is permanent and remains operational at all times. In another alternative embodiment, the channel is ephemeral and is re-created when needed.

In accordance with one embodiment of the invention, once the unique identifier of management device 104 has been added to the list of devices authorized to connect to the managed device, upon each connection attempt, the managed device retrieves the certificate corresponding to the stored unique identifier. The certificate, in turn, can be used to retrieve the public key of the management device or devices that are authorized to connect to the managed device. The managed device then uses the extracted public key to verify that the communication received from the management device is indeed from the authorized management device. This is accomplished, for example, by decrypting the digital signature embedded in the received content with the public key of the authorized device and comparing the decrypted information with the digest extracted from the received content itself. This step insures that the communication is indeed from the management device, which has been authorized to connect. To preserve the privacy of the communication, the managed device encrypts all the content that it sends to the management device with the public key extracted from the certificate corresponding to the stored unique identifier of the authorized device. This insures that the sent content may be used only by the authorized management device.

As is well known in the art, the certificates are typically signed with the private key of the trusted certificate authority (CA). Therefore, the devices may decrypt the certificate using the published public key of that CA. In another embodiment of the invention, the provisioning stage uses public key certificates to establish each other's credentials. However, once the communication channel has been established, the two devices are configured to choose a substitute credential that has better performance characteristics than the public key cryptography.

In one embodiment of the inventive system, the managed and management devices may be deployed in a network topology wherein either one or both of them employs a dynamic network IP address. In order for the management function to succeed, the devices need to be able to contact each other despite network address changes. To this end, in the case of the permanent management channel, the channel is re-established (or its parameters appropriately altered) after the network IP address changes. In the case of the ephemeral channel, the device with the dynamic address updates its address information with the other device after each change. This update scheme is implemented using, for example, a notification message between the devices that is sent whenever the IP address change is detected. In an alternative embodiment, the message comprising the IP address information is sent at regular time intervals during time periods when communication channel 114 is not connected. In yet alternative embodiment, the facility to locate the other device could be provided as an extra function of management device locator server 106. To this end, the managed devices may also register with such a locator server.

In another embodiment, either the management or the managed device may not only have dynamic public network address, but also have its local network IP addresses in a private address space. Specifically, the aforementioned device may be situated behind a network address translation (NAT) device, well-know in the art. To allow reverse connections through such a NAT device, the embodiment of the invention utilizes a tunneling protocol, such as Generic Routing Encapsulation (GRE), IP-in-IP, or IPsec. In a configuration where the management function of the management device requires the statically addressed device to be able to connect to the dynamically addressed device at any time, the described permanent communication management channel is used, and the NAT-traversal features of a tunneling protocol such as IPsec are employed in order to keep the dynamically addressed device permanently reachable. In the embodiment wherein the management function is always triggered from the dynamically addressed device, a described ephemeral tunnel is used instead. Alternatively, as may be appreciated by skilled in the art, it is also possible to use a tunneling protocol solely to allow reverse connections through a NAT device, in the case where the security features of management tunnel 114 are not desired.

Figure 4:
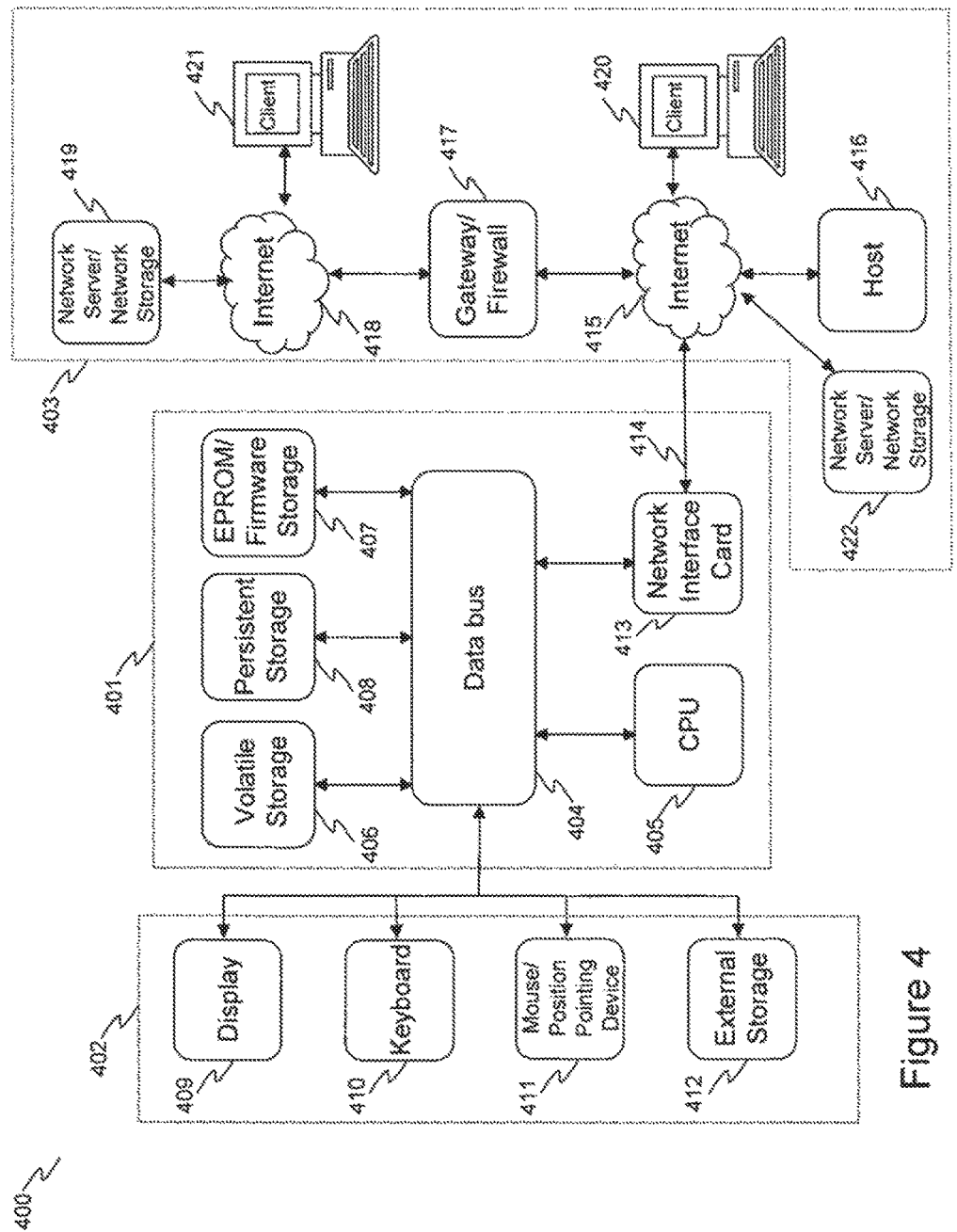
FIG. 4 illustrates an exemplary embodiment of a computer platform upon which the inventive networking system may be implemented.

FIG. 4 is a block diagram that illustrates an embodiment of a computer/server system 400 upon which an embodiment of the inventive methodology may be implemented. The system 400 includes a computer/server platform 401, peripheral devices 402 and network resources 403.

Computer platform 401 may include a data bus 404 or other communication mechanism for communicating information across and among various parts of the computer platform 401, and a processor 405 coupled with bus 401 for processing information and performing other computational and control tasks. Computer platform 401 also includes a volatile storage 406, such as a random access memory (RAM) or other dynamic storage device, coupled to bus 404 for storing various information as well as instructions to be executed by processor 405. The volatile storage 406 also may be used for storing temporary variables or other intermediate information during execution of instructions by processor 405. Computer platform 401 may further include a read only memory (ROM or EPROM) 407 or other static storage device coupled to bus 404 for storing static information and instructions for processor 405, such as basic input-output system (BIOS), as well as various system configuration parameters. A persistent storage device 408, such as a magnetic disk, optical disk, or solid-state flash memory device is provided and coupled to bus 401 for storing information and instructions.

Computer platform 401 may be coupled via bus 404 to a display 409, such as a cathode ray tube (CRT), plasma display, or a liquid crystal display (LCD), for displaying information to a system administrator or user of the computer platform 401. An input device 410, including alphanumeric and other keys, is coupled to bus 401 for communicating information and command selections to processor 405. Another type of user input device is cursor control device 411, such as a mouse, a trackball, or cursor direction keys for communicating direction information and command selections to processor 404 and for controlling cursor movement on display 409. This input device typically has two degrees of freedom in two axes, a first axis (e.g., x) and a second axis (e.g., y), that allows the device to specify positions in a plane.

An external storage device 412 may be connected to the computer platform 401 via bus 404 to provide an extra or removable storage capacity for the computer platform 401. In an embodiment of the computer system 400, the external removable storage device 412 may be used to facilitate exchange of data with other computer systems.

The invention is related to the use of computer system 400 for implementing the techniques described herein. In an embodiment, management device 104 and managed devices 101-103 may reside on a machine such as computer platform 401. In an embodiment, management device locator server 106 may also be deployed on a machine such as computer platform 401. According to one embodiment of the invention, the techniques described herein are performed by computer system 400 in response to processor 405 executing one or more sequences of one or more instructions contained in volatile memory 406. Such instructions may be read into volatile memory 406 from another computer-readable medium, such as persistent storage device 408. Execution of the sequences of instructions contained in volatile memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 405 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 408. Volatile media includes dynamic memory, such as volatile storage 406. Transmission media includes coaxial cables, copper wire and fiber optics, including the wires that comprise data bus 404. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 405 for execution. For example, the instructions may initially be carried on a magnetic disk from a remote computer. Alternatively, a remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on the data bus 404. The bus 404 carries the data to the volatile storage 406, from which processor 405 retrieves and executes the instructions. The instructions received by the volatile memory 406 may optionally be stored on persistent storage device 408 either before or after execution by processor 405. The instructions may also be downloaded into the computer platform 401 via Internet using a variety of network data communication protocols well known in the art.

The computer platform 401 also includes a communication interface, such as network interface card 413 coupled to the data bus 404. Communication interface 413 provides a two-way data communication coupling to a network link 414 that is connected to a local network 415. For example, communication interface 413 may be an integrated services digital network (ISDN) card or a modem to provide a data communication connection to a corresponding type of telephone line. As another example, communication interface 413 may be a local area network interface card (LAN NIC)

to provide a data communication connection to a compatible LAN. Wireless links, such as well-known 802.11a, 802.11b, 802.11g and Bluetooth may also used for network implementation. In any such implementation, communication interface 413 sends and receives electrical, electromagnetic or optical signals that carry digital data streams representing various types of information.

Network link 413 typically provides data communication through one or more networks to other network resources. For example, network link 414 may provide a connection through local network 415 to a host computer 416, or a network storage/server 417. Additionally or alternatively, the network link 413 may connect through gateway/firewall 417 to the wide-area or global network 418, such as an Internet. Thus, the computer platform 401 can access network resources located anywhere on the Internet 418, such as a remote network storage/server 419. On the other hand, the computer platform 401 may also be accessed by clients located anywhere on the local area network 415 and/or the Internet 418. The network clients 420 and 421 may themselves be implemented based on the computer platform similar to the platform 401.

Local network 415 and the Internet 418 both use electrical, electromagnetic or optical signals that carry digital data streams. The signals through the various networks and the signals on network link 414 and through communication interface 413, which carry the digital data to and from computer platform 401, are exemplary forms of carrier waves transporting the information.

Computer platform 401 can send messages and receive data, including program code, through the variety of network(s) including Internet 418 and LAN 415, network link 414 and communication interface 413. In the Internet example, when the system 401 acts as a network server, it might transmit a requested code or data for an application program running on client(s) 420 and/or 421 through Internet 418, gateway/firewall 417, local area network 415 and communication interface 413. Similarly, it may receive code from other network resources.

The received code may be executed by processor 405 as it is received, and/or stored in persistent or volatile storage devices 408 and 406, respectively, or other non-volatile storage for later execution. In this manner, computer system 401 may obtain application code in the form of a carrier wave.

It should be noted that the present invention is not limited to any specific types of managed devices and management devices. Also, the requisite network configuration may be achieved using a variety of known networking protocols.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized networking system. It is intended that the specification and examples be considered as exemplary only, with a true scope and spirit of the invention being indicated by the following claims.

What is claimed is:

1. A system comprising:
   a plurality of network devices, including a management device, a managed firewall device and a locator server with which the management device registers and updates its current Internet Protocol (IP) address;
   wherein the management device is manufactured by a particular manufacturer, wherein the management device is programmed to remotely monitor or manage, via a network-enabled management interface, one or more network devices of the plurality of network devices that are manufactured by the particular manufacturer after the one or more network devices are installed within a private IP network;
   wherein a Public Key Infrastructure (PKI)-authenticated unique identifier is provided within each of the plurality of network devices by, during a manufacturing or distribution process of each network device of the plurality of network devices, generating a digital certificate or private key pair and a unique identifier of the network device and storing the digital certificate or private key pair and the unique identifier within the network device, wherein the unique identifier is authenticated by the digital certificate which is signed by the particular manufacturer;
   wherein the managed firewall device is configured to trust the management device by, prior to installation of the managed firewall device, within the private IP network, storing the unique identifier of the management device within the managed firewall device;
   wherein, responsive to being installed within the private IP network, the managed firewall device initiates establishment of an Internet Protocol Security (IPsec) tunnel with the management device by retrieving the current IP address of the management device from the locator server; and
   wherein, prior to allowing the management device to perform management functionality in relation to the managed firewall device via the IPsec tunnel, credentials of the management device are verified by the managed firewall device by comparing the PKI-authenticated unique identifier of the management device to the unique identifier of the management device stored within the managed firewall device.

2. The system of claim 1, wherein the unique identifier comprises a digest of the digital certificate.

3. The system of claim 1, wherein the unique identifier comprises a serial number of the network device.

4. The system of claim 1, wherein the management device is deployed within the private IP network.

5. The system of claim 1, wherein the management device remotely manages the managed firewall device by interacting with the managed firewall device via the Internet.

6. The system of claim 1, wherein the locator server comprises a public server.

7. The system of claim 1, wherein the locator server is implemented within a managed device that is a trusted peer of the managed firewall device.

8. A method comprising:

prior to being installed within a private Internet Protocol (IP) network, receiving and storing, by a managed firewall device of a plurality of network devices, a unique identifier of a management device of the plurality of network devices, wherein the plurality of network devices further includes a locator server with which the management device registers and updates its current IP address and wherein, during a manufacturing or distribution process of each network device of the plurality of network devices, a digital certificate or private key pair and a unique identifier of the network device are stored therein, wherein the unique identifier is authenticated by the digital certificate which is signed by the particular manufacturer, thereby providing a Public Key Infrastructure (PKI)-authenticated unique identifier within each of the plurality of network devices;

responsive to being installed within the private IP network, initiating, by the managed firewall device, establishment of an Internet Protocol Security (IPsec) tunnel with the management device by retrieving the current IP address of the management device from the locator server; and allowing, by the managed firewall device, the management device to perform management functionality in relation to the managed firewall device via the IPsec tunnel after credentials of the management device are verified by the managed firewall device by comparing the PKI-authenticated unique identifier of the management device to the unique identifier of the management device to the unique identifier of the management device stored within the managed firewall device.

9. The method of claim 8, wherein the unique identifier comprises a digest of the digital certificate.

10. The method of claim 8, wherein the unique identifier comprises a serial number of the network device.

11. The method of claim 8, wherein the management device is deployed within the private IP network.

12. The method of claim 8, wherein the management device remotely manages the managed firewall device by interacting with the managed firewall device via the Internet.

13. The method of claim 8, wherein the locator server comprises a public server.

14. The method of claim 8, wherein the locator server is implemented within a managed device that is a trusted peer of the managed firewall device.

* * * * *